INVENTORS
SAM H. HASTINGS,
HENRY G. SCHUTZE,
JAMES A. ANDERSON JR.,
BY
AGENT

2,752,403

CO-DIMERIZATION OF CONJUGATED CYCLIC DIENES AND ACYCLIC DIENES

Henry G. Schutze, Sam H. Hastings, and James A. Anderson, Jr., Baytown, Tex., assignors, by mesne assignments, to Esso Research and Engineering Company, Elizabeth, N. J., a corporation of Delaware Application April 11, 1952, Serial No. 281,822

11 Claims. (Cl. 260—666)

The present invention is directed to the reaction of dienes. More particularly, the invention is directed to a polymerization process in which cyclic diolefins are reacted with acyclic diolefins. In its more specific aspects, the invention is concerned with a reaction of a cyclic conjugated diolefin and an acyclic conjugated diolefin to form a co-dimer of said conjugated diolefins.

The present invention may be briefly described as comprising reacting a cyclic conjugated diolefin having 5 carbon atoms in a ring with an acyclic conjugated diolefin at a temperature in the range from 350° F. to 450° F. for a sufficient length of time to form a product containing a substantial amount of a codimer of said diolefins. The product may be suitably treated, such as by distillation, to recover the co-dimer.

The cyclic diolefin employed as a component of the feed stock may suitably be cyclopentadiene, 5-methylcyclopentadiene-1,3 and 2-methylcyclopentadiene-1,3.

The acyclic conjugated diolefin may be illustrated by isoprene and trans-piperylene.

A suitable feed stock may be a naphtha, such as a cracked naphtha, which contains both the cyclic conjugated diolefin and the acyclic conjugated diolefin. For instance, a steam-cracked naphtha is a suitable feed stock for the present invention and such naphthas may contain both isoprene and cyclopentadiene as well as the other diolefins mentioned above.

The reaction in accordance with our invention produces co-dimers of the cyclic diolefin and the acyclic diolefin in accordance with the following equations showing the structural formulas of reactant materials and the product.

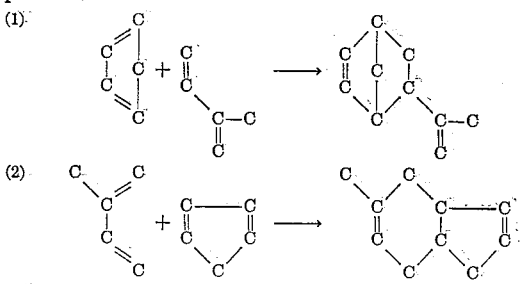

The compound produced in the reaction illustrated in the first equation is 5-isopropenyl-3,6-endomethylenecyclohexene-1, while the compound produced by the reaction shown in the second equation is 5-methyl-4,7,8,9-tetrahydroindene. It has been observed that the product produced as shown in the first equation given above is produced predominantly when the content of the acyclic diolefin in the feed stock exceeds the content of the cyclic diolefin in the feed stock and the product formed by the reaction illustrated by the second equation predominates when the cyclic diolefin content of the feed stock exceeds the acyclic diolefin content. In short, in accordance with our invention it is possible to control the formation of a specific co-dimer of acyclic and cyclic conjugated diolefins by suitably controlling the ratio of the reactants.

It is possible to operate with ratios of cyclic diolefins to acyclic diolefins in the range from 0.1:1 to 1:0.1. Both co-dimers may be produced at substantially equimolar ratios of the reactants. It is preferred that the ratio of cyclic diolefin to acyclic diolefin be controlled to produce the product as shown in the second equation supra. Hence, it is contemplated that the cyclic diolefin should be present in an amount at least equal to the amount of the acyclic diolefin in the reaction mixture.

The temperature at which the reaction should be conducted is in a range from 350° to 450° F. Below 350° F. the cyclic diolefin dimerizes, with small amounts of the co-dimer being formed. Above 350° F., however, the reaction between the acyclic diolefin and the cyclic diolefin predominates (with the formation of the co-dimer being favored). Above 450° F. there is danger of decomposition of the co-dimer, and furthermore, the rate of dimerization of the acyclic diolefin becomes appreciable.

The invention will be further illustrated by reference to the drawing in which

Figure 1:
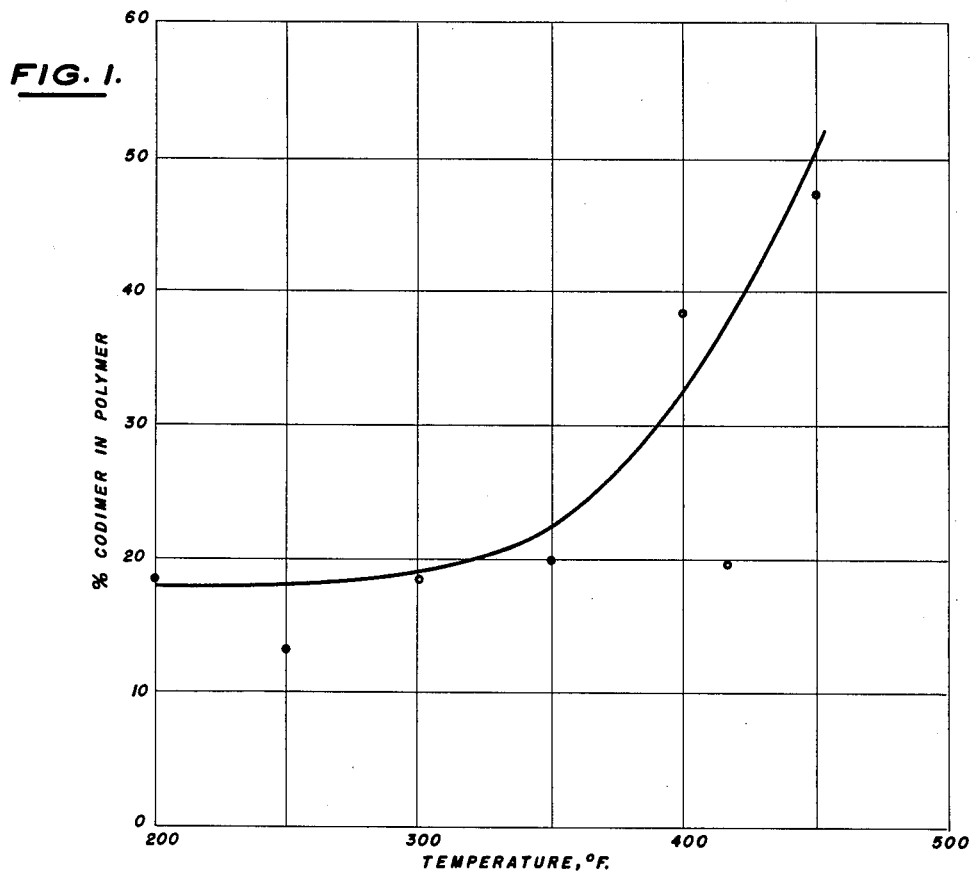
Fig. 1 is a plot of data showing the criticality of the temperature range.

In order to construct the graph of Fig. 1, a number of runs were made in which isoprene and cyclopentadiene were held at varying temperatures for periods of time sufficient to form a co-dimer of the isoprene and the cyclopentadiene. Runs were made at temperatures ranging from 200° to 450° F. and at pressures in the range from 18 to 163 pounds. The proportions of the reactants were substantially equimolar in all runs. The pertinent operating and analytical data for these runs are presented in the table which follows:

Table

| Temperature, ° F | 200 | 250 | 300 | 350 | 400 | 450 |
|---|---|---|---|---|---|---|
| Seconds on Temperature | 605,000 | 7,200 | 7,200 | 7,200 | 7,200 | 7,200 |
| Mols Isoprene Charged | 0.74 | 0.92 | 0.92 | 0.92 | 0.92 | 0.55 |
| Mols Cyclopentadiene Charged | 0.74 | 0.89 | 0.89 | 0.89 | 0.89 | 0.54 |
| Mols Co-dimer Recovered | 0.10 | 0.04 | 0.09 | 0.19 | 0.44 | 0.30 |
| Mols Polymer Recovered | 0.54 | 0.31 | 0.49 | 0.95 | 1.15 | 0.64 |
| Mols Unreacted | 0.84 | 1.46 | 1.23 | 0.67 | 0.22 | 0.15 |
| Percent Co-dimer in Polymer | 18.5 | 13 | 18.4 | 20 | 38 | 47 |
| Mols Cyclopentadiene in Product | .005 | .018 | .031 | .038 | .033 | .032 |
| Mols Dicyclopentadiene in Product | .415 | .721 | .584 | .297 | .077 | .043 |

The plot in Fig. 1 is a plot of the per cent of the co-dimer in the polymer against temperature. It will be noted that the curve is relatively flat at temperatures up to 350° F. but rises sharply thereafter indicating that at temperatures below 350° F. the amount of the co-dimer produced is relatively small and above 350° F. the proportion of the co-dimer increases sharply. At below 350° F. cyclopentadiene dimerizes to form dicyclopentadiene. It is known that even at above 350° F. the cyclopentadiene dimerizes; however the higher temperatures favor the de-dimerization step with the result that cyclopentadiene is continuously made available to react with the isoprene resulting in the formation of the more stable co-dimers, shown in the equations given supra.

Figure 2:
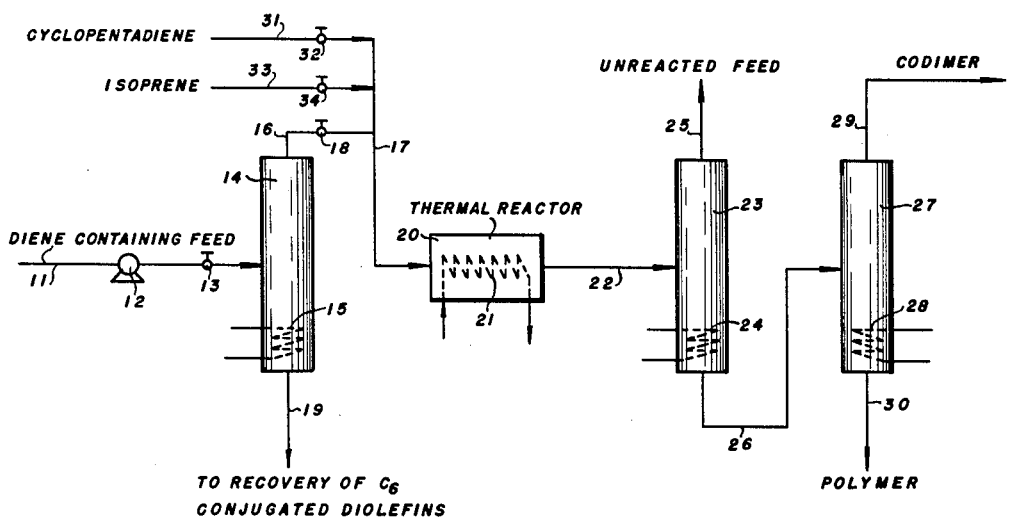
Fig. 2 is a flow diagram of a preferred mode of conducting the invention.

Referring now to Fig. 2, a diene-containing feed, such as a steam cracked naphtha containing both cyclic conjugated diolefins having five carbon atoms in a ring and acyclic conjugated diolefins, for example, isoprene and cyclopentadiene, as well as the higher members of the homologous series of these two compounds, is introduced into the system from a source, not shown, by line 11 which contains pump 12. Line 11 is also provided with a valve 13 to control the flow therethrough. The diolefin containing cracked naphtha is introduced into a distillation tower 14 which may be a series of distillation towers. Distillation tower 14 is provided with all auxiliary equipment usually associated with modern distillation towers which includes means for inducing reflux and internal contacting means, such as bell cap trays and the like, to insure intimate contact between vapors and liquids. Distillation tower 14 is also provided with a heating means illustrated by heating coil 15 to allow adjustments of temperature and pressure in tower 14.

Conditions are adjusted in tower 14 to allow the removal as an overhead fraction by line 16 a $C_5$ fraction containing cyclopentadiene and isoprene. This fraction is routed by line 16 into line 17 by opening valve 18 in line 16. Tower 14 is also provided with a line 19 through which heavier fractions may be discharged.

The $C_5$ fraction containing isoprene and cyclopentadiene is then routed by line 17 into a thermal reaction zone 20 which is provided with a heating means illustrated by steam coil 21. The temperature of the $C_5$ fraction containing cyclopentadiene and isoprene is raised to a temperature in the range from 350° to 450° F. and the $C_5$ fraction is maintained at that temperature for a time in the range between 10 and 120 minutes whereby the cyclic and acyclic diolefins are interpolymerized to form co-dimers of the two diolefins. After the soaking at the temperature indicated has been completed the reacted product is withdrawn from zone 20 by line 22 and is discharged into a second distillation tower 23 which may be similar in all respects to distillation tower 14 in that it is provided with means for inducing reflux and similar contacting means to tower 14. Tower 23 is also provided with a heating means illustrated by a heating coil 24 allowing adjustments of temperature and pressure in tower 23 to allow removal, as an overhead fraction by line 25 of unreacted feed components which may be recycled to line 17 as desired. The co-dimer and other polymers which are produced in the reaction are withdrawn from tower 23 by line 26 and discharged thereby into a third distillation tower 27 which is similar in all respects to towers 14 and 23 and like towers 14 and 23 is provided with a heating means illustrated by a steam coil 28. Conditions are adjusted in tower 27 to allow removal as an overhead fraction by line 29 of the co-dimer produced in reaction zone 20 and recovery thereof while heavier polymer may be discharged from the system by line 30. Since the co-dimer recovered by line 29 from distillation tower 27 may include both of the co-dimers shown in the equations supra, these materials may be used as such, as a mixture or suitably treated for separation of same.

It is also possible to operate our invention employing substantially pure feed stocks. For example, an alternative method to that described involves charging a feed stock comprising essentially cyclic conjugated diolefin and an acyclic conjugated diolefin. This may be accomplished in the mode described in conjunction with the drawing by introducing controlled amounts of cyclopentadiene through branch line 31 controlled by valve 32 into line 17 and simultaneously introducing by branch line 33 controlled by valve 34 controlled amounts of isoprene into line 17. Of course, it is understood that in this mode of our invention valve 18 in line 16 may be closed to allow the reaction of the substantially pure feed components. It is also possible, however, to admit into line 17 along with the steam-cracked naphtha as described controlled amounts of the cyclic diolefin and acyclic diolefin. Thereafter in either one of the alternative methods the operation is as has been described.

The co-dimers formed in accordance with our invention may suitably be employed in feed stocks for halogenation processes for the production of insecticides; they may be suitably used as insecticidal components in themselves; or they may be employed as drying oil components, such as may be blended in paints, lacquers and varnishes. It is also contemplated that the co-dimer obtained as shown in Equation two (2) supra may be subjected to a suitable hydrogenation-dehydrogenation treatment to form the corresponding methyl indane. The simultaneous hydrogenation-dehydrogenation is a modification of the technique of Rampton, Analytical Chemistry, vol. 21, 1377 (1949) in which the $C_6$ ring of the co-dimer is dehydrogenated to an aromatic nucleus and the $C_5$ ring is hydrogenated.

It is to be noted that the unreacted feed withdrawn by line 25 will have its content of diolefins reduced appreciably by virtue of the formation of the co-dimer and the polymers as illustrated. Therefore, it is contemplated that our invention is useful in another manner in reducing the diolefin content of diolefin-containing feeds.

It is desirable to conduct the invention in the presence of a polymerization inhibitor, which acts to inhibit the chain-type or linear polymerization of the acyclic conjugated diolefin, plus increasing the potential yields of the desired co-dimer. As examples of these inhibitors may be mentioned tertiary butyl catechol, and similar phenolic materials, such as hydroquinone.

The nature and objects of the present invention having been completely described and illustrated, what we wish to claim as new and useful and to secure by Letters Patent is:

1. A polymerization process which comprises reacting a cyclic conjugated diolefin having 5 carbon atoms in a ring with an acyclic conjugated diolefin at a temperature in the range from 350° to 450° F. for a sufficient length of time no more than 120 minutes to form a product containing a substantial amount of a co-dimer of said diolefins, said cyclic conjugated diolefin being present in an amount at least equal to the amount of acyclic conjugated diolefin.

2. A polymerization process which comprises reacting a cyclic conjugated diolefin having 5 carbon atoms in a ring with an acyclic conjugated diolefin at a temperature in the range from 350° to 450° F. for a time in the range from 10 to 120 minutes to form a product containing a substantial amount of a co-dimer of said diolefins, said cyclic conjugated diolefin being present in an amount at least equal to the amount of acyclic conjugated diolefin.

3. A polymerization process which comprises reacting a cyclic conjugated diolefin having 5 carbon atoms in a ring with an acyclic conjugated diolefin at a temperature in the range from 350° to 450° F. for a time in the range from 10 to 60 minutes in the presence of an oxidation inhibitor to form a product containing a substantial amount of a co-dimer of said diolefins, and recovering said co-dimer, said cyclic conjugated diolefin being present in an amount at least equal to the amount of acyclic conjugated diolefin.

4. A polymerization process which comprises forming a mixture of cyclopentadiene and isoprene, subjecting said mixture to a temperature in the range from 350° to 450° F. for a sufficient length of time no more than 120 minutes to form a substantial amount of a co-dimer of said diolefins, and recovering said co-dimer, said cyclopentadiene being present in an amount at least equal to the amount of isoprene.

5. A polymerization process which comprises forming a mixture of cyclopentadiene and isoprene, subjecting said mixture to a temperature in the range from 350° to 450° F. for a time in the range between 10 minutes and 120 minutes in the presence of an oxidation inhibitor to form a substantial amount of a co-dimer of said diolefins, and recovering said co-dimer, said cyclopentadiene being present in an amount at least equal to the amount of isoprene.

6. A process in accordance with claim 5 in which the oxidation inhibitor is tertiary butyl catechol.

7. A polymerization process which comprises reacting substantially equimolar amounts of cyclopentadiene and isoprene at a temperature in the range between 350° and 450° F. for a time in the range between 10 minutes and 120 minutes to form a product containing substantial amounts of co-dimers of said cyclopentadiene and isoprene, and recovering said co-dimers from said product.

8. A process in accordance with claim 7 in which the reaction is conducted in the presence of a phenolic oxidation inhibitor.

9. A polymerization process which comprises subjecting a steam-cracked naphtha containing a cyclic conjugated diolefin having 5 carbon atoms in a ring and an acyclic conjugated diolefin to a temperature in the range from 350° to 450° F. for a time in the range from 10 to 120 minutes to copolymerize said cyclic diolefin with said acyclic diolefin and to form a product containing a substantial amount of a co-dimer of said diolefins and distilling said product to recover said co-dimer, said cyclic conjugated diolefin being present in an amount at least equal to the amount of acyclic conjugated diolefin.

10. A method in accordance with claim 9 in which the steam-cracked naphtha contains cyclopentadiene and isoprene.

11. A method for producing methyl indane which comprises reacting cyclopentadiene and isoprene at a temperature in the range between 350° and 450° F. for a sufficient length of time no more than 120 minutes to form a co-dimer having the structural formula

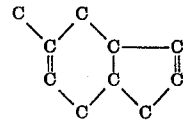

said cyclopentadiene being present in an amount at least equal to the amount of isoprene, and recovering said co-dimer.

References Cited in the file of this patent
UNITED STATES PATENTS

| | | |
|---|---|---|
| 2,401,414 | Doumani et al. | June 4, 1946 |
| 2,409,259 | Doumani et al. | Oct. 15, 1946 |
| 2,411,822 | Doumani | Nov. 26, 1946 |
| 2,508,922 | Luten et al. | May 23, 1950 |

OTHER REFERENCES

Norton: Chemical Reviews, vol. 31 (1942), pages 430–437 (8 pages).

Rampton: Analytical Chemistry, vol. 21 (1949), pages 1377–1383 (7 pages).